(12) United States Patent
Wang et al.

(10) Patent No.: US 10,053,143 B2
(45) Date of Patent: Aug. 21, 2018

(54) SYSTEMS AND METHODS FOR IMPROVING TORQUE FEEL IN COLUMN EPAS

(71) Applicant: Ford Global Technologies, LLC, Dearborn, MI (US)

(72) Inventors: Dexin Wang, Livonia, MI (US); Timothy Gerard Offerle, Saline, MI (US); Douglas Scott Rhode, Farmington Hills, MI (US); Taehyun Shim, Ann Arbor, MI (US); Yijun Li, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/345,047

(22) Filed: Nov. 7, 2016

(65) Prior Publication Data
US 2018/0127021 A1    May 10, 2018

(51) Int. Cl.
| | |
|---|---|
| *B62D 5/00* | (2006.01) |
| *B62D 6/10* | (2006.01) |
| *B62D 6/02* | (2006.01) |
| *B62D 6/04* | (2006.01) |
| *B62D 15/02* | (2006.01) |
| *B62D 5/04* | (2006.01) |
| *B62D 3/12* | (2006.01) |

(52) U.S. Cl.
CPC ............ *B62D 5/0463* (2013.01); *B62D 3/126* (2013.01); *B62D 6/02* (2013.01); *B62D 6/04* (2013.01); *B62D 6/10* (2013.01); *B62D 15/02* (2013.01)

(58) Field of Classification Search
CPC ...... B62D 5/00; B62D 5/0463; B62D 5/0472; B62D 6/00; B62D 6/02; B62D 6/04; B62D 6/10; B62D 15/00; B62D 15/02; B62D 3/00; B62D 3/1126
See application file for complete search history.

(56) References Cited

U.S. PATENT DOCUMENTS

| | | | |
|---|---|---|---|
| 8,150,582 B2 | 4/2012 | Blommer | |
| 8,219,285 B2 | 7/2012 | Watanabe | |
| 8,897,965 B2 | 11/2014 | Tamaizumi | |
| 9,051,005 B2 | 6/2015 | Bolourchi | |
| 9,221,491 B2 | 12/2015 | Kodera | |
| 9,272,732 B2 | 3/2016 | Greul | |
| 2003/0204294 A1* | 10/2003 | Gluch | B62D 5/0457 701/41 |
| 2010/0268422 A1* | 10/2010 | Blommer | B62D 5/0472 701/44 |
| 2016/0059884 A1 | 3/2016 | Gu | |
| 2016/0185266 A1* | 6/2016 | Line | B60N 2/504 297/452.49 |

\* cited by examiner

*Primary Examiner* — Yonel Beaulieu
(74) *Attorney, Agent, or Firm* — David R. Stevens; Stevens Law Group

(57) ABSTRACT

A controller for a power steering system estimates rack force and its derivative, such as based on lateral acceleration, yaw rate, vehicle speed, or other parameters. A control torque is calculated based on the rack force, its derivative, and the vehicle speed and is summed with an input torque from the driver to determine an amount of assist torque to provide. The control torque may be a shape function that has a sign determined by the sign of the derivative and a magnitude that decreases from a maximal value with increase in the magnitude of the rack force. The maximal value may be determined according to vehicle speed.

18 Claims, 4 Drawing Sheets

SYSTEMS AND METHODS FOR IMPROVING TORQUE FEEL IN COLUMN EPAS

BACKGROUND

Field of the Invention

This invention relates to power steering systems for a vehicle.

Background of the Invention

In column EPAS (electric power assisted steering) the power for moving a steering rack is applied to the steering column rather than to the rack itself. Using column EPAS for power steering system has significant cost savings over rack EPAS. However, with existing EPAS control strategies, rack EPAS provides better steering performance than column EPAS. In order to achieve higher quality, it is desirable to deliver equivalent or even better steering performance in column EPAS than rack EPAS at lower costs. Improving column EPAS performance by changing mechanical system design requirements is typically not cost effective.

The system and methods disclosed herein provide an approach for improving torque feel for column EPAS systems.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

Figure 1A:
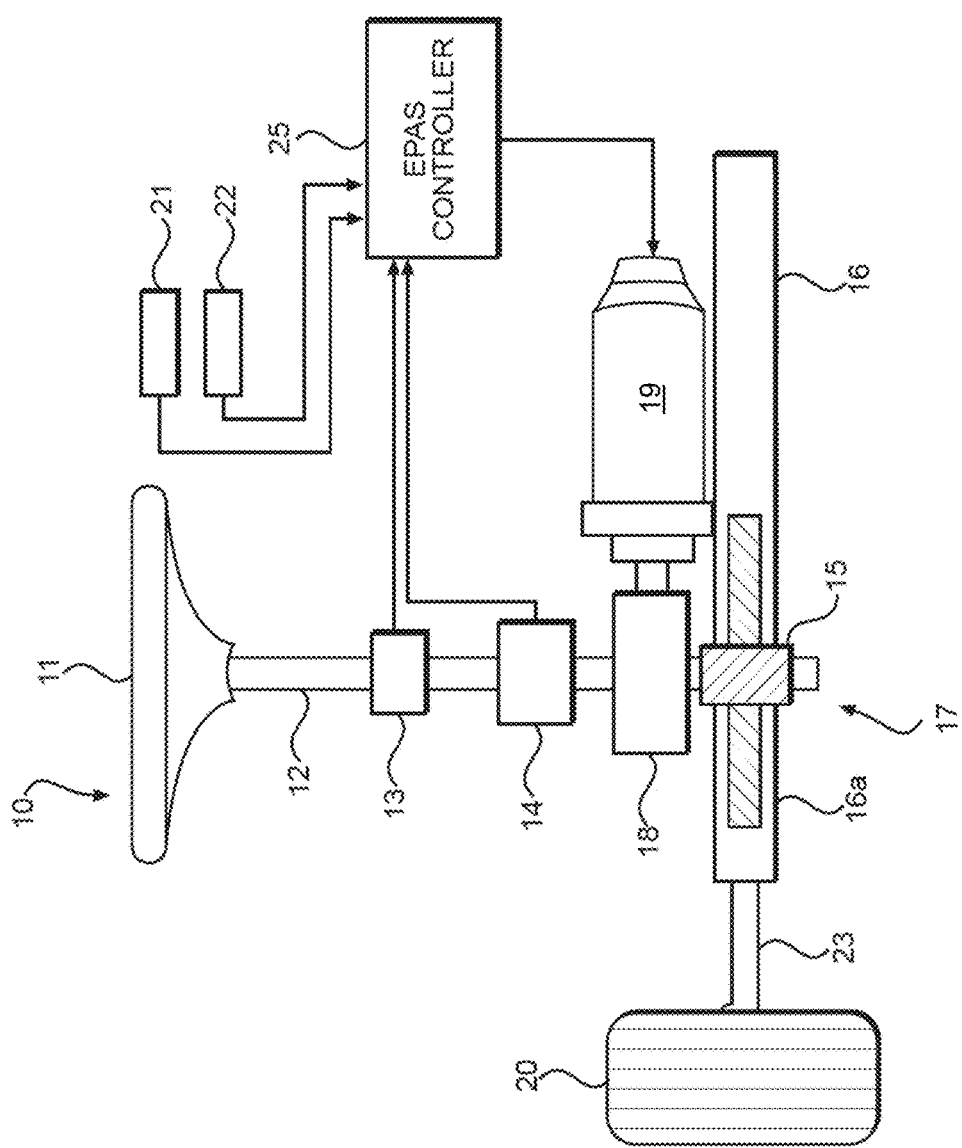
FIG. 1A is a diagram of mechanical components of a column EPAS system in accordance with an embodiment of the present invention.

FIG. 1A shows the structure of an exemplary embodiment of a steering system in which the systems and methods disclosed herein may be implemented. An Electronic Power Assisted Steering (EPAS) system 10 adds auxiliary torque to the steering torque applied by a driver to a steering column 12 via a steering wheel 11. In the illustrated exemplary embodiment, the steering column 12 is connected to the steering wheel 11 at the top end, and a pinion gear 15 is attached to the bottom end. The pinion gear 15 meshes with a rack gear 16a formed in a rack shaft 16. The pinion gear 15 and the rack gear 16a together form a rack-and-pinion mechanism 17. Tie rods 23 are provided at both ends of the rack shaft 16, and turning wheels 20 are attached at the outer ends of the tie rods 23.

A motor 19 that outputs rotational force for assisting the steering torque is connected to the steering column 12 via a power transmission device 18. The rotational force of the motor 19 is applied as auxiliary torque to the steering column 12 via the power transmission mechanism 18.

A steering torque sensor 14 is attached to the steering column 12. When the driver adds steering torque to the steering column 12 by operating the steering wheel 11, the steering torque sensor 14 detects the steering torque applied to the steering column 12. A steering wheel angle sensor 13 senses the steering wheel angle in the rotation of the steering column 12.

Outputs of various vehicles sensors are used according to the embodiments disclosed herein, including, for example, a vehicle yaw rate sensor 21 and a vehicle lateral acceleration sensor 22. An EPAS controller 25 may compute an estimated rack force and the derivative thereof based on at least one of the signals received from sensors 13, 21 and 22. As described below with respect to FIG. 2, the rack force is an estimate of forces acting on the rack gear, including forces applied by the driver through the steering wheel 11, the motor 19, and external disturbances contacting the road wheels. The EPAS controller 25 may also compute the estimated rack force based on signals received from steering torque sensor 14. As described below, the EPAS controller 25 may adjust the torque applied by the motor 19 according to the estimated rack force and its derivative.

Figure 1B:
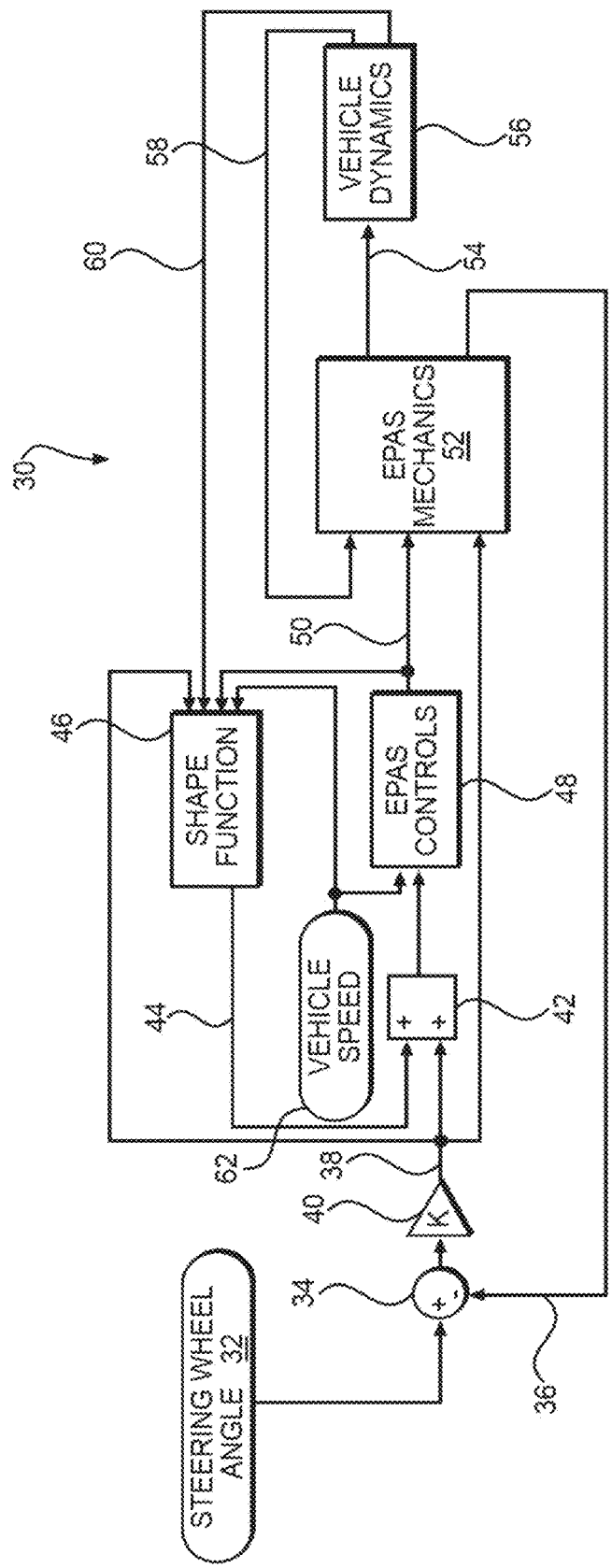
FIG. 1B is a schematic block diagram of components for implementing control logic for a column EPAS system in accordance with an embodiment of the present invention.

FIG. 1B illustrates a control flow 30 for providing power assisted steering according to the embodiments disclosed herein. A driver provides input in the form of a steering wheel angle 32. A difference 34 between a pinion input angle 36 and the steering wheel angle 32 results in twisting of a torsion bar between the steering wheel 11 and the pinion 15. The difference 34 is proportional to an input torque 38 due to a spring constant 40 of the torsion bar. The input torque 38 is summed 42 with a control torque 44 determined according to the methods disclosed herein, which are represented in FIG. 1B by the shape function 46.

The sum 42 of the input torque 38 and the control torque 44 is input to EPAS controls 48 that output an assist torque signal 50 to the EPAS mechanics 52 (e.g. the motor 19 and power transmission device 18) instructing the EPAS mechanics 52 to provide assist torque in accordance with the assist torque signal 50. In general, the assist torque signal 50 will increase with the sum 42. In the illustrated embodiment, the assist torque signal 50 is also a function of the vehicle speed 62. As known in the art, the EPAS control 48 may reduce the amount of assist torque as speed increases in order to improve stability.

The EPAS mechanics 52 cause change in the rack position 54, which provides an input to vehicle dynamics 56, e.g. the tires, body, and suspension of the vehicle, which results in a rack force 58 and a vehicle response 60 (e.g. lateral acceleration and yaw rate of the vehicle).

The shape function 46 takes as inputs the vehicle response 60 or an actual measurement of rack force 58. The shape function 46 may also take as an input the speed 62 of the vehicle, as measured by a speed sensor as known in the art. In some embodiments, the shape function 46 also takes as inputs the assist torque 50 and the input torque 38. The manner in which the control torque 44 is calculated based on these inputs is described below with respect to FIGS. 2 and 3.

Figure 2:
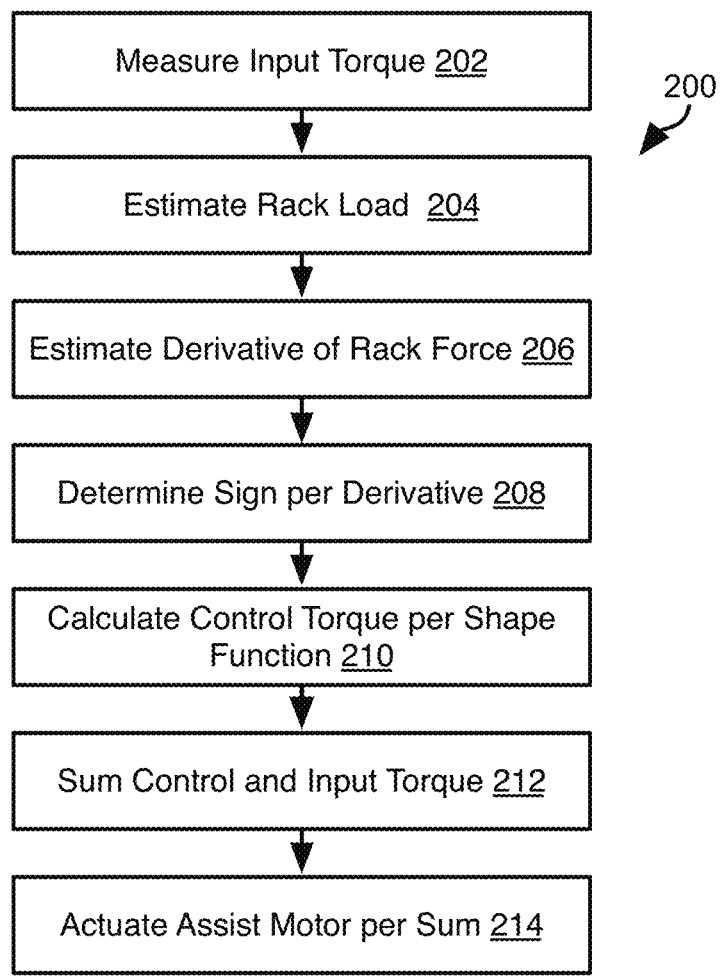
FIG. 2 is a process flow diagram of a method for improving torque feel in a column EPAS system in accordance with an embodiment of the present invention.

Referring to FIG. 2, the illustrated method 200 may be performed by the EPAS controller 25. The method 200 may include measuring 202 at least one of input torque 38 and steering wheel angle 32. As noted above, input torque may be estimated as proportional to a difference between the steering wheel angle 32 and pinion input angle 36. Alternatively, torque may be estimated based on measuring actual deformation of the torsion bar. For purposes of this disclosure "input torque" is used to refer to any metric that is proportional to or an approximation of torque exerted by the driver on the steering wheel 11.

The method 200 may include estimating 204 rack force. The rack force represents the sum of forces acting on the rack gear 16a, including the input torque 38, assist torque from the motor 19, and forces exerted by the tires 20. Various techniques are known in the art for estimating rack force based on such parameters as lateral acceleration and yaw rate, which may be estimated from the outputs of the sensors 21, 22. For example, the EPAS controller 25 may use the approach of U.S. Pat. No. 8,150,582 issued Apr. 3, 2012 and entitled "Systems and methods for decoupling steering rack force disturbances in electric steering," which is hereby incorporated herein by reference in its entirety.

The derivative of the estimated rack force may also be estimated 206. This may include any numerical differentiation technique known in the art for estimating a first derivative of a set of samples, e.g. the finite difference approximation, central difference approximation, or others. As described below, in some embodiments, only the sign of the derivative is needed. Accordingly, dividing by a time step may be omitted from the numerical differentiation technique that is used.

The method 200 may include determining 208 a sign of the control torque according to the derivative of the estimated torque. For example, in some embodiments, the sign of the control torque will be the same as the sign of the derivative of the estimated rack force. Specifically, if the rack force is increasing, the control torque will be positive and if the rack force is decreasing the control torque will be negative. In some embodiments and for some vehicle speeds, this relationship may be reversed such that if the rack force is decreasing the control torque will be positive and if the rack force is increasing the control torque will be negative.

The method 200 may further include calculating 210 a control torque according to a shape function. The shape function depends upon vehicle speed, the rack force derivative sign, and rack force magnitude. The shape function is tapered off per rack force magnitude. The shape functions may be tuned to achieve a desired steering feel performance.

The control torque is calculated from the shape functions and limited by a pre-set maximal control torque, which may be a function of vehicle speed. For example, the EPAS controller 25 may store or access an array of maximal control torques experimentally determined for a plurality of speeds. The maximal control torque for step 208 may be an entry from this array corresponding to the vehicle speed 62, interpolated from values in this array closest to the vehicle speed 62, or determined according to a function of speed. In general, the maximal control torque may decrease with increasing speed.

Calculating 210 the control torque according to the shape function may include tapering the shape with increase in the magnitude of the estimated rack force. Tapering may include any tapering function known in the art that decreases with an increasing input argument. For example, where L is the magnitude of the estimated rack force and M is the maximal control torque of step 208, the magnitude of the control torque may be set equal to a function of the form M/(1+ alpha*L), M*Exp(-L*alpha), where alpha is a factor that determines how quickly the function tapers with increasing L. Any other function that decreases with an input argument L may also be used. The function used and the parameters of the function, e.g. alpha, may be determined experimentally to provide a desired road feel and stability. The tapering function, e.g. the parameters (e.g., alpha) defining it, may vary with vehicle speed 62.

In some embodiments, the shape function is piecewise linear. For example, the shape function may be constant, e.g. equal to the maximal control torque for a first range of magnitudes of the estimated rack forces centered on zero. The shape function may then taper to zero, e.g., linearly with increase in the magnitude of the estimated rack force above the first range.

The tapering step 212 reduces the impact on stability of control caused by the control torque. Most steering occurs about the on-center position and user perception of road feel will be most pronounced about the on-center position. Accordingly, the control torque is reduced away from the on-center position to improve stability without perceptibly degrading road feel.

The rack force magnitude is used to determine tapering according to the tapering function and the derivative is only used to determine a sign of the control torque. However, the tapering function is a gradual function and reduces to insignificance for high rack force magnitudes. Accordingly, estimates of rack force and its derivative are not required to be very accurate. Errors of up to 20% can be present and significant improvement in driver perception will still be achieved.

Note that in the method 200, the rack force magnitude is used to reduce the control torque with movement from the on-center position. Accordingly, rack force magnitude may be viewed as a proxy for distance of the rack gear 16a from an on-center position. Accordingly, in some embodiments, the position of the rack gear 16a may be measured and the tapering function may decrease with distance of the rack gear 16a from the on-center position. In such embodiments, the sign of the control torque may be determined according to a direction of movement of the rack gear 16a, e.g. positive for leftward and negative for rightward movement or the opposite of this.

The method 200 may then include summing 214 the control torque as tapered according to step 212 and the input torque from step 202. The sum may then be used to actuate 216 the assist motor. As shown in FIG. 1B, this may include inputting the sum 42 to the EPAS controls 48 that provide an assist torque control signal 50 that increases with an input according to a linear function or some other function.

Other implementations of a shape function may also be used. For example, rather than providing a maximal torque and tapering function, a single function for a given vehicle speed may receive the rack force and its derivative and output a control torque. Likewise, an adjustment to the amount of assist torque provided by the motor 19 may be performed at a different point in the control process. For example, the assist torque 50 output by the EPAS controls 48 may be adjusted according to the control torque determined according to the method 200.

Figure 3:
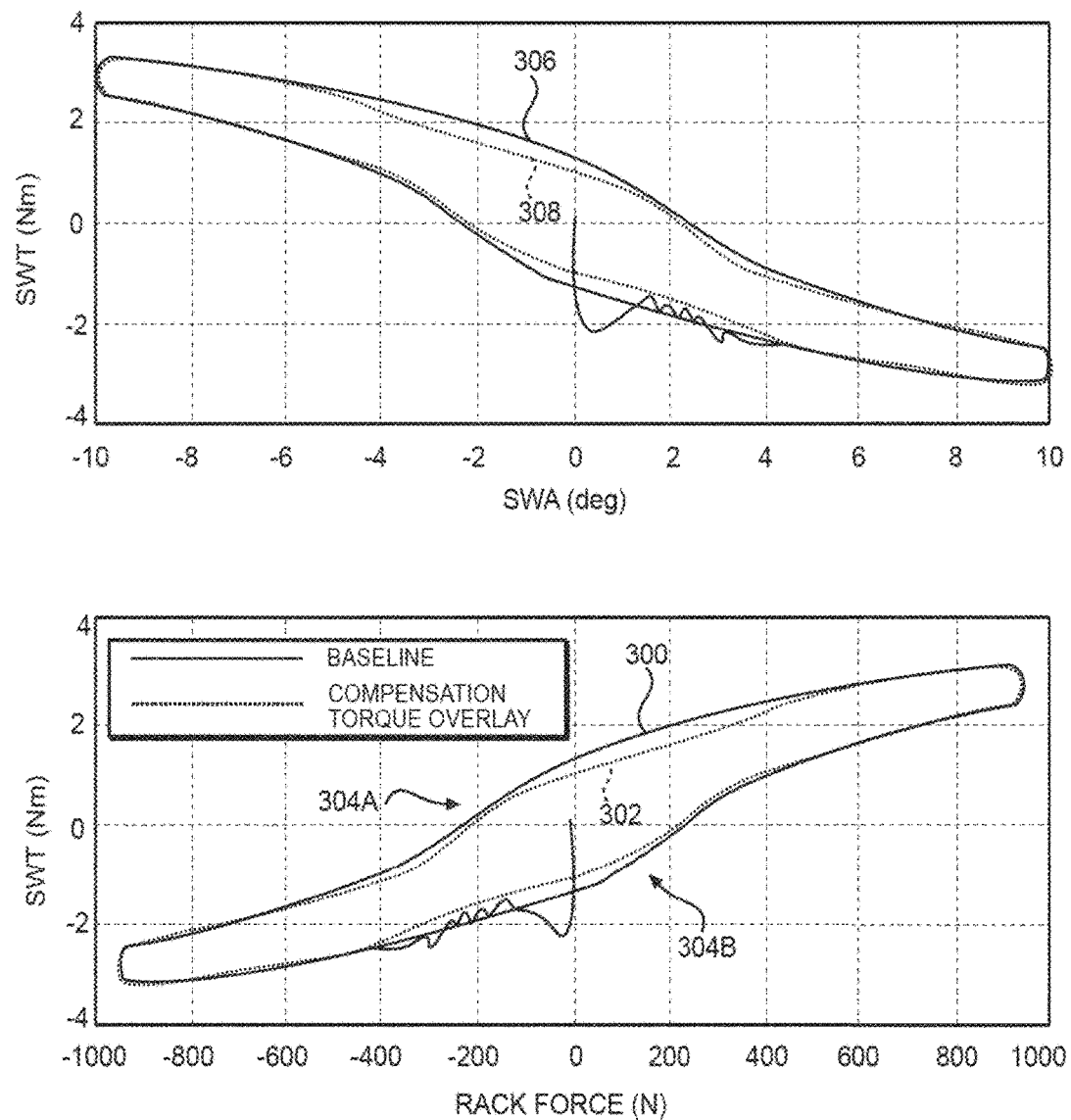
FIG. 3 is a plot of steering wheel torque with respect to steering wheel angle and rack force for a column EPAS system in accordance with an embodiment of the present invention.

FIG. 3 includes a plot of steering wheel torque (SWT) with respect to rack force (bottom plot) and SWT with respect to steering wheel angle (SWA) (top plot). SWT represents the torque felt by the driver at the steering wheel 11. Plot 300 illustrates SWT with respect to rack force without correction according to the methods disclosed herein. Plot 302 illustrates SWT with respect to rack force with use of a control torque according to the method 300.

Region 304A shows rightward movement of the steering wheel 11 and rack 16a. As is apparent, the plot 302 shows a decrease in the SWT relative to the SWT of the baseline plot 300 in the on-center region. This results in a reduced perceived steering effort for the driver.

Region 304B shows leftward movement of the steering wheel 11 and rack 16a. In this case, the plot 302 shows an increase in SWT with respect to steering wheel torque relative to the baseline plot 300 in the on-center region. However, for region 304B, the torque is negative, so the increase translates to a decrease in magnitude and a perceived decrease in steering effort.

As is apparent from the plot 302, as the magnitude of rack force increases, the adjustments to the input torque go to zero and the compensated torque 302 is approximately (e.g. within 5%) equal to the baseline plot 300.

Plot 306 illustrates a baseline relationship between SWA and SWT for a column EPAS system without compensation according to the methods disclosed herein. Plot 308 illustrates the relationship between SWA and SWT where SWT has been compensated according to the methods disclosed herein.

A good road feel implies that SWT follows rack force with a small phase delay. However, potentially higher friction and compliance in column EPAS masks or deteriorates the road feel. As is apparent in FIG. 3, the relationship between SWA and SWT is closer in plot 308 and the amount of hysteresis is reduced. This results in an improved road feel for the driver inasmuch as the torque perceived by the driver (SWT) varies more directly with rotation of the steering wheel (SWA). In addition, the magnitude of SWT in the on-center region is reduced thereby reducing steering effort.

The plots of FIG. 3 illustrate the effectiveness of the control approach described herein, including the use of a shape function to control the input torque signal controlling the motor 19. The SWA vs. SWT and SWT vs. rack force achieved by the steering system may be changed and improved by tuning of the shape function.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system for a vehicle comprising:
   a power steering rack;
   a steering wheel coupled to the power steering rack; and
   a controller operably coupled to the power steering rack and the steering wheel and programmed to calculate an estimated rack force for the power steering rack and adjust an assist force provided by the power steering rack according to a shape function of the estimated rack force and a derivative of the estimated rack force;
   wherein the shape function:
      has a maximal value that is a function of a speed of the vehicle;
      has an output sign that changes according to a sign of the derivative of the estimated rack force; and
      has an output magnitude equal to the maximal value when an absolute value of the estimated rack force is zero and decreasing from the maximal value with increase in the absolute value of the estimated rack force.

2. The system of claim 1, further comprising a vehicle speed sensor operably coupled to the controller, the shape function being further a function of a speed of the vehicle.

3. The system of claim 1, further comprising a lateral acceleration sensor coupled to the controller;
   wherein the controller is programmed to determine an estimated rack force and an estimated derivative of the rack force according to an output of the lateral acceleration sensor.

4. The system of claim 1, wherein the power steering rack is a column electric power assisted steering (EPAS) system.

5. The system of claim 4, further comprising a steering torque sensor coupled to the controller;
   wherein the controller is programmed to—
      receive an output from the steering torque sensor;
      adjust the output according to the shape function to obtain an adjusted output; and
      determine an amount of assist torque according to the adjusted output.

6. The system of claim 1, wherein the shape function provides an output having a sign that changes according to a sign of the derivative of the estimated rack force.

7. The system of claim 6, wherein the shape function provides an output that decreases with magnitude of the estimated rack force.

8. The system of claim 1, wherein the shape function is such that the output magnitude decreases from the maximal value with increase in the absolute value of the estimated rack force according to a tapering function, the tapering function having parameters varying according to the speed of the vehicle.

9. The system of claim 1, wherein the shape function is such that the output sign is opposite the sign of the derivative of the estimated rack force.

10. A method comprising:
   providing a vehicle including a power steering rack and a controller operably coupled to the power steering rack;
   providing a steering wheel coupled to the power steering rack;
   calculating, by the controller, an estimated rack force for the power steering rack;
   calculating, by the controller, a derivative of the estimated rack force; and
   adjusting, by the controller, an assist force provided by the power steering rack according to a shape function taking as inputs the estimated rack force and the derivative of the estimated rack force;
   further comprising computing, by the controller, the output of the shape function such that:
      the output has a maximal value that is a function of a speed of the vehicle;
      the output has an output sign that changes according to a sign of the derivative of the estimated rack force; and
      the output has an output magnitude equal to the maximal value when an absolute value of the estimated rack force is zero and decreasing from the maximal value with increase in the absolute value of the estimated rack force.

11. The method of claim 10, wherein the vehicle further comprises a vehicle speed sensor operably coupled to the controller, the method further comprising adjusting the assist force provided by the power steering track according to the shape function that takes as inputs the estimated rack force, the derivative of the estimated rack force, and an output of the speed sensor.

12. The method of claim 10, wherein the vehicle further comprises a lateral acceleration sensor coupled to the controller, the method further comprising calculating, by the controller, the estimated rack force according to an output of the lateral acceleration sensor.

13. The method of claim 10, wherein the power steering rack is a column electric power assisted steering (EPAS) system.

14. The method of claim 13, wherein the vehicle further comprises a steering torque sensor coupled to the controller; wherein the method further comprises:
    receiving, by the controller, an output from the steering torque sensor;
    adjusting, by the controller, the output according to the shape function to obtain an adjusted output; and
    inputting, by the controller, the adjusted output to the EPAS as an input torque.

15. The method of claim 10, further comprising computing, by the controller, an output of the shape function such that the output has a sign that changes according to a sign of the derivative of the estimated rack force.

16. The method of claim 15, further comprising computing, by the controller the output of the shape function such that the output decreases with rack force.

17. The method of claim 10, further comprising computing, by the controller the output of the shape function such that the output magnitude decreases from the maximal value with increase in the absolute value of the estimated rack force according to a tapering function, the tapering function having parameters varying according to the speed of the vehicle.

18. The method of claim 10, further comprising computing, by the controller the output of the shape function such that the output sign is opposite the sign of the derivative of the estimated rack force.

* * * * *